United States Patent
Noice et al.

(10) Patent No.: US 7,661,078 B1
(45) Date of Patent: Feb. 9, 2010

(54) METHOD AND SYSTEM FOR IMPLEMENTING METAL FILL

(75) Inventors: David C. Noice, Palo Alto, CA (US);
William Kao, Fremont, CA (US);
Inhwan Seo, Fremont, CA (US);
Xiaopeng Dong, San Jose, CA (US);
Gary W. Nunn, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 174 days.

(21) Appl. No.: 11/069,759

(22) Filed: Feb. 28, 2005

(51) Int. Cl.
*G06F 17/50* (2006.01)
*G06F 9/45* (2006.01)

(52) U.S. Cl. ............................................. 716/4; 716/5

(58) Field of Classification Search .................. 716/8, 716/11–12, 4–5
See application file for complete search history.

(56) References Cited

U.S. PATENT DOCUMENTS

| | | | |
|---|---|---|---|
| 7,231,624 B2 | 6/2007 | Vuong et al. | |
| 7,287,324 B2 | 10/2007 | Vuong et al. | |
| 2003/0229479 A1* | 12/2003 | Smith et al. | 703/14 |
| 2004/0019868 A1* | 1/2004 | Li | 716/11 |
| 2004/0025125 A1* | 2/2004 | Li | 716/5 |
| 2004/0098393 A1 | 5/2004 | Vuong et al. | |
| 2004/0098674 A1 | 5/2004 | Vuong et al. | |
| 2004/0098688 A1* | 5/2004 | Vuong et al. | 716/8 |
| 2005/0044520 A1 | 2/2005 | Vuong et al. | |
| 2005/0080607 A1* | 4/2005 | Lakshmanan et al. | 703/14 |
| 2005/0167702 A1* | 8/2005 | Booth et al. | 257/207 |
| 2005/0229130 A1* | 10/2005 | Wu et al. | 716/8 |
| 2006/0031796 A1* | 2/2006 | Meaney | 716/6 |
| 2007/0234265 A1 | 10/2007 | Vuong et al. | |

OTHER PUBLICATIONS

Guardiani, C. et al. "Proactive Design for Manufacturing (DFM) for Nanometer SoC Designs" Proceedings of the IEEE 2004 Custom Integrated Circuits Conference, Orlando, FL, Oct. 3-6, 2004, pp. 306-316.

He, L. et al. "Design of Integrated-Circuit Interconnects with Accurate Modeling of Chemical-Mechanical Planarization" Proceedings of SPIE-2005, San Diego, CA, Feb. 12-17, 2005, 11 pgs.

Long, C. et al. "Floorplanning Optimzation with Trajectory Piecewise-Linear Model for Pipelined Interconnects" Proceedings of the 41st Design Automation Conference (DAC '04), San Diego, CA, Jun. 7-11, 2004, pp. 640-645.

Maynard, D.N. et al. "A Manufacturing Perspective of Physical Design Characterization" Proceedings of the 2002 IEEE/SEMI Conference and Workshop on Advanced Semiconductor Manufacturing, Boston, MA, Apr. 30-May 2, 2002, pp. 240-246.

(Continued)

*Primary Examiner*—Jack Chiang
*Assistant Examiner*—Suresh Memula
(74) *Attorney, Agent, or Firm*—Vista IP Law Group, LLP

(57) ABSTRACT

Disclosed is an improved method and system for implementing metal fill for an integrated circuit design. When an engineering change order is implemented, the existing dummy metal fill geometries are initially ignored when modifying the layout, even if this results in shorts and/or other DRC violations. Once the ECO changes have been implemented, those violations caused by interaction between the changes and the metal fill are repaired afterwards.

32 Claims, 12 Drawing Sheets

OTHER PUBLICATIONS

Zhang, S. et al. "Wire Spacing and Metal Filling: A New Solution for Layout Density Control and Manufacturability Improvement" University of California—Santa Cruz, UCSC-CRL-02-11, 2002, 14 pgs.

U.S. Appl. No. 11/407,873, filed Apr. 19, 2006.

* cited by examiner

|  | M5 Vdd |  | M4 Fill |
| --- | --- | --- | --- |
|  | M5 Vss |  | M5 Fill |

METHOD AND SYSTEM FOR IMPLEMENTING METAL FILL

BACKGROUND AND SUMMARY

The invention relates to the design and manufacture of integrated circuits, and more particularly, to techniques, systems, and methods for implementing metal-fill on an integrated circuit.

In recent years, in integrated circuit (IC) manufacturing, chemical-mechanical polishing (CMP) has emerged as an important technique for planarizing dielectrics because of its effectiveness in reducing local step height and achieving a measure of global planarization not normally possible with spin-on and resist etch back techniques. However, CMP processes have been hampered by layout pattern dependent variation in the inter-level dielectric (ILD) thickness which can reduce yield and impact circuit performance.

Metal-fill patterning is a common approach for reducing layout pattern dependent dielectric thickness variation. Metal-fill patterning is the process of filling large open areas on each metal layer with a metal pattern to compensate for pattern-driven variations. The manufacturer of the chip normally specifies a minimum and maximum range of metal that should be present at each portion of the die. If there is an insufficient amount of metal at a particular portion on the chip, then metal-fill is used to increase the proportion of metal in that portion. However, too much metal may cause dishing to occur. Therefore, the metal-fill process should not cause the die to exceed any specified maximum range of metal for the chip.

Even after the IC design has been completed, it is possible that additional engineering changes may be implemented at a later point in time. These additional changes may be implemented, for example, to correct an existing problem, to improve performance, or to add new functionality to the device. The process of implementing an engineering change after a device has been manufactured is often called the Engineering Change Order (ECO) process.

If the IC design does not include any dummy metal fill geometries, then the ECO could complete without having any impact on areas of the device that were not explicitly affected by the changes (e.g., in connectivity) required by the ECO. However, the ECO process is much more complicated for designs that include dummy metal fill geometries to control the effects of on-chip variation (OCV), such as IC designs for processes that use CMP.

One approach for implementing an Engineering Change Order (ECO) after a device has been manufactured is to delete dummy metal fill geometries that were added to the original design. This makes room for changes in the layout that might be required by the ECO process. By removing the dummy metal fill, the placement and routing operations have sufficient free space to be able to complete without causing shorts or design rule check (DRC) violations.

One significant problem with this approach is that the process of first removing the original dummy metal fill geometries, then implementing the ECO, and then finally inserting new dummy metal fill can lead to different timing characteristics in areas of the device that were not affected by the ECO itself. This could cause additional iterations in the ECO process to repair errors caused by the initial ECO changes.

Disclosed is an improved method and system for implementing metal fill for an integrated circuit design. In some embodiments, when an engineering change order is implemented, the existing dummy metal fill geometries are initially ignored when modifying the layout, even if this results in shorts and/or other DRC violations. Once the ECO changes have been implemented, those violations caused by interaction between the changes and the metal fill are repaired afterwards.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The accompanying drawings are included to provide a further understanding of the invention and, together with the Detailed Description, serve to explain the principles of the invention.

DETAILED DESCRIPTION

Disclosed is an improved method and system for implementing metal fill for an integrated circuit design. In some embodiments, when an engineering change order is implemented, the existing dummy metal fill geometries are initially ignored when modifying the layout, even if this results in shorts and/or other DRC violations. Once the ECO changes have been implemented, those violations caused by interaction between the changes and the metal fill are repaired afterwards.

Figure 1:
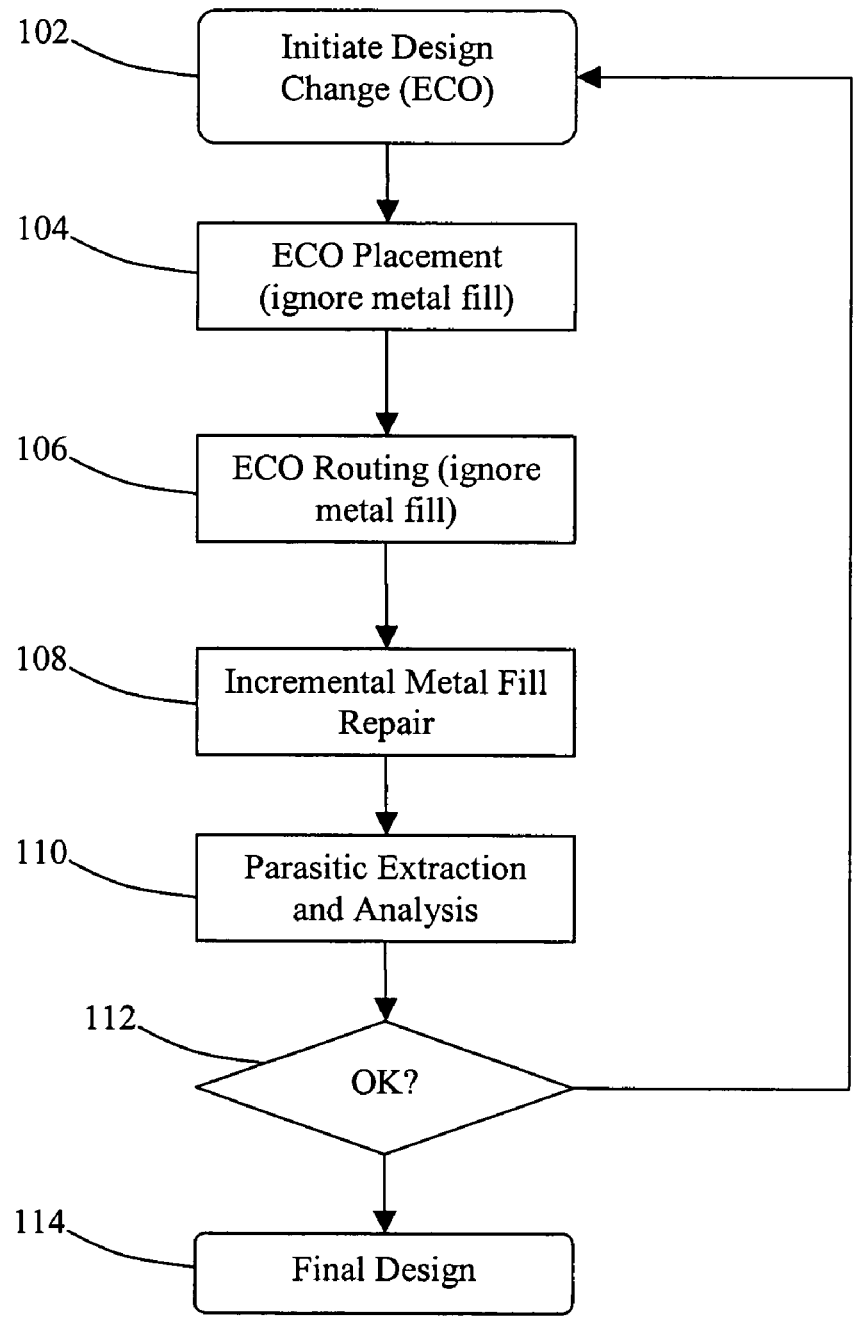
FIG. 1 shows a flow diagram of a process for implementing metal fill according to some embodiments of the invention.

FIG. 1 is a high-level flow of a process to implement metal fill according to some embodiments of the invention. The disclosed process involves modifying the standard behavior of one or more electronic design automation (EDA) tools in the ECO flow.

At 102, the ECO change process is initiated, e.g., to update ECO connectivity. Any suitable or conventional approach can be taken to initiate the ECO process. As noted above, the ECO changes may be desired or initiated, for example, to correct an existing problem, to improve performance, or to add new functionality to the device.

At 104 and 106, the ECO placement and routing actions are performed. Placement action 104 involves incremental placement of added instances of cells in the design while ignoring the existence of the metal fill geometries. Routing action 106 involves incremental routing of the added and modified nets in the design while also ignoring the existence of the metal fill geometries. It is noted that these actions are performed by ignoring any design errors or rule violations that may be caused by the existing metal fill geometries.

Next, the process performs repairs (108), if any are necessary, to correct design violations and errors that may have resulted from the placement 104 and routing 106 actions. Incremental repairs are performed, for example, to correct shorts and DRC violations, such as by trimming away or removing existing metal fill geometries that cause the short or DRC violation. In addition, in portions of the layout where original signal geometries were removed due to deletions in the ECO process, dummy metal fill can be added to get those areas back to the desired metal density, e.g., for portions of the design in which signal routing has been removed.

At 110, parasitic extraction and analysis may be performed to check the suitability of the layout and metal fill changes caused by the ECO and metal fill repair actions. At 112, if the new layout is not suitable, the process may proceed back to 102 repeat the process actions again. Otherwise, the process can generate the final design 114. In some embodiments, the iteration of 110/112 are not required in the flow since parasitics are unaffected in areas of the design that the ECO did not change.

Figure 2A:
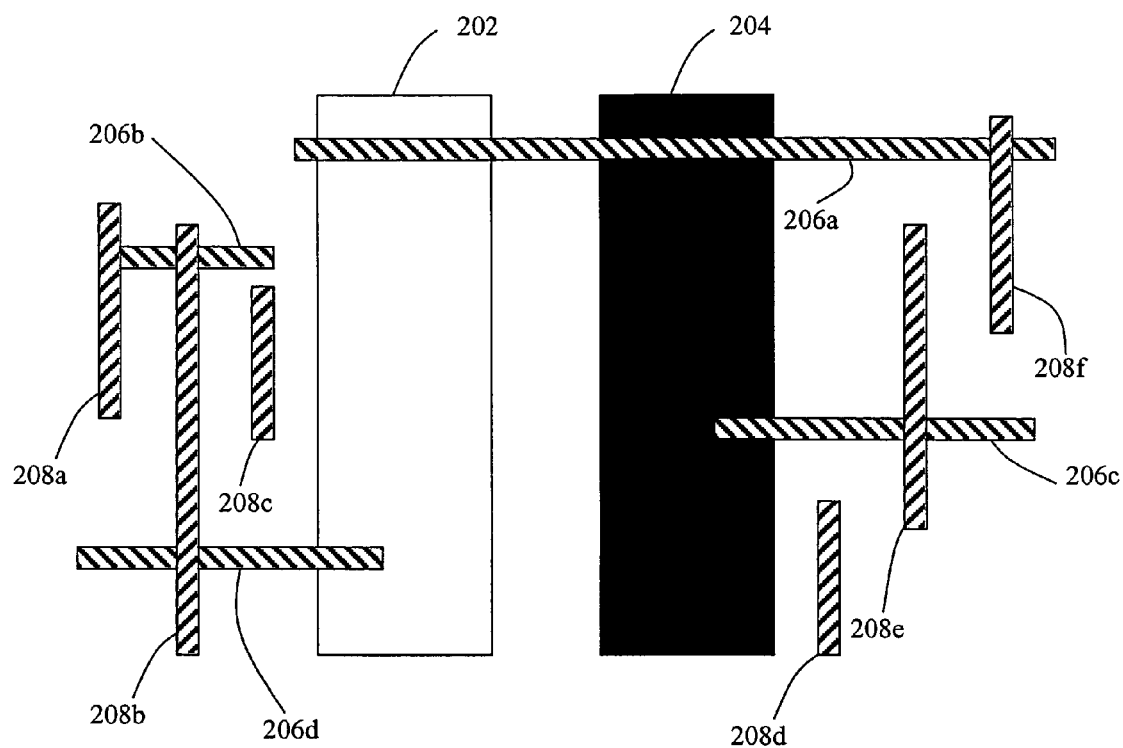
FIGS. 2A-D illustrate an application of an embodiment of the invention to a portion of an IC design.
Figure 2A:
Figure 2A:
Figure 2A:
Figure 2A:

FIGS. 2A-D illustrate an application of this process. FIG. 2A shows a portion of a layout configuration for an IC design that includes objects 202 (Vdd) and 204 (Vss) on metal layer M5. Metal fill on layer M5 includes fill objects 208a, 208b, 208c, 208d, 208e, and 208f. Metal fill on metal layer M4 include fill objects 206a, 206b, 206c, and 206d.

Assume that an ECO is issued to add additional signal routing for this portion of the IC design. In the present embodiment, the placement and routing of the additional signal routing objects is performed by ignoring the presence of the metal fill geometries.

Figure 2B:
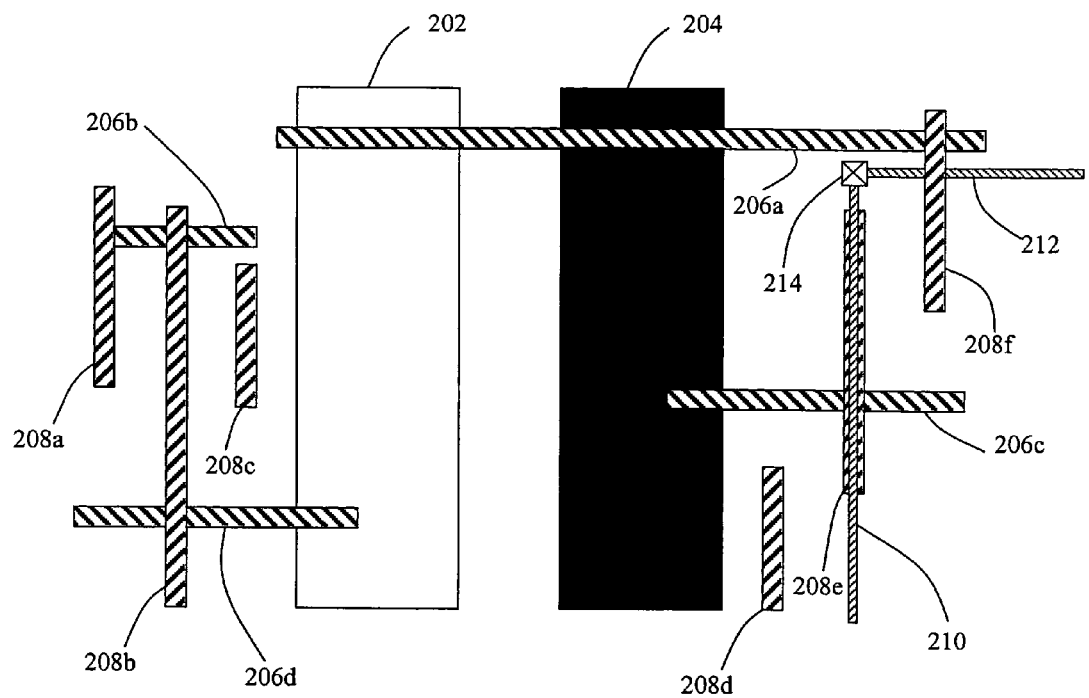

FIG. 2B illustrates the addition of new signal routing objects to the layout. In particular, wiring object 210 on layer M5, via 214, and wiring object 212 on layer M4 have been added. It is noted that these objects were placed and routed even though it appears that shorts and/or design rule violations may occur based upon exiting metal fill geometries. In particular, wiring object 210 shorts against metal fill object 208e and spacing violations exist relative to metal fill object 206a.

Figure 2C:
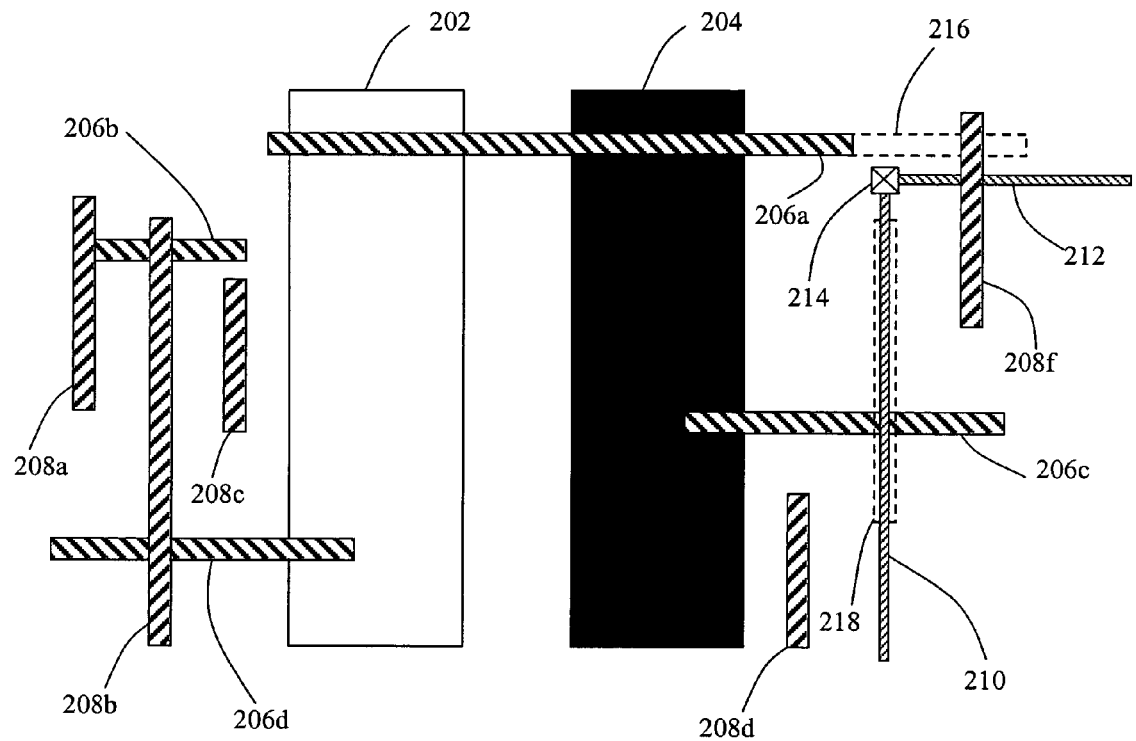
Figure 2C:

FIG. 2C illustrates how repairs are performed to address design errors and rule violations caused by the metal fill. In particular, dashed box 216 shows the amount of metal that should be trimmed away to repair errors/violations caused by metal fill object 206a. Dashed box 218 shows the amount of metal that should be trimmed away to repair errors/violations caused by metal fill object 208e.

Figure 2D:
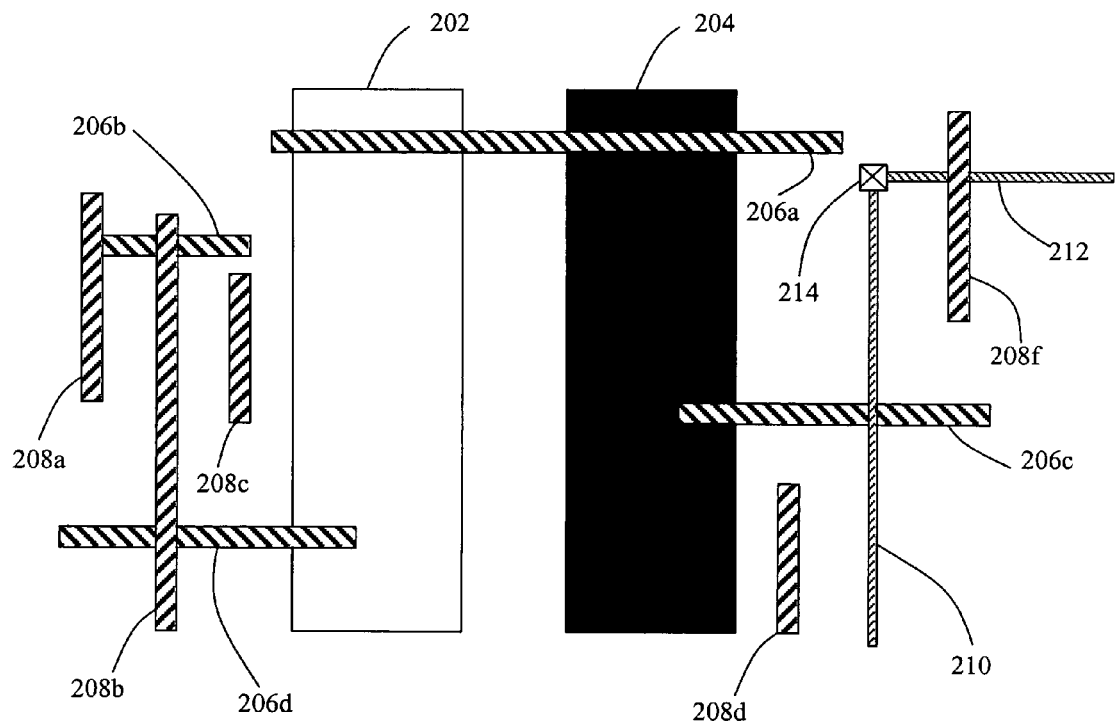
Figure 2D:

FIG. 2D shows the final layout for this portion of the IC design after the metal fill repairs of FIG. 2C have been made. In particular, metal fill object 206a has been trimmed such that its boundaries no longer cause a design rule violation relative to the newly added objects 212 and 214. Also, metal fill object 208e has been entirely removed to prevent a short against newly added object 210.

This process improves the ECO flow in numerous ways. One significant improvement is that timing characteristics in areas not affected by the ECO are unchanged during the repair process. For the example of FIGS. 2A-D, this means that only the affected portion of the design has been changed. The metal fill in the other, unchanged portions of the IC design did not need to undergo wholesale removal of metal fill and then have all that metal fill re-inserted. Moreover, the overall time to complete the ECO including handling of the metal fill effects is reduced, both because the steps themselves are faster and because of the reduction in iterations. This is in contrast to the alternate approach of removing the metal fill geometries at the beginning of the ECO flow and then inserting new metal fill after the ECO changes, since this alternate approach causes potentially many iterations and a longer time period to converge due to timing differences after the metal fill is reinserted into the design.

It is noted that the same flow can be applied if an ECO or other type of change is made to the design before the tape-out (design transfer to manufacturing), but after timing has been validated with metal fill geometries inserted. This makes the incremental metal fill repair action a part of the normal design flow as metal fill can be added earlier in the flow for increased accuracy of parasitic extraction, instead of using assumptions about what the metal fill effects will have on the cross-coupling capacitances.

Moreover, the actions of FIG. 1 can be implemented as part of multiple, separate tools, or can be combined into a single EDA tool that implements the entire flow.

Figure 8:
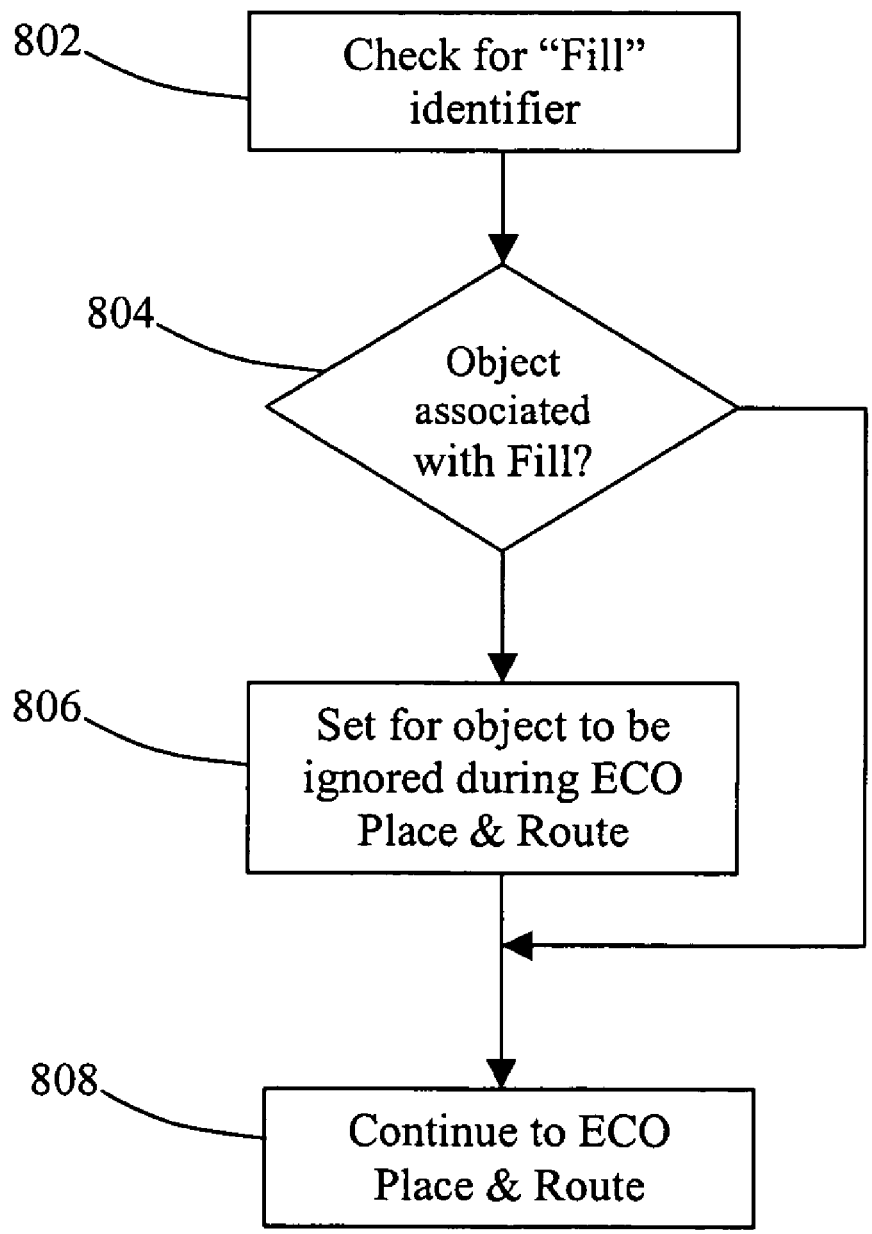
FIG. 8 shows a flow diagram of a process for configuring one or more EDA tools to ignore metal fill geometries according to some embodiments of the invention.

FIG. 8 shows a flowchart of a process for configuring an EDA tool to "ignore" the metal fill geometries when performing the ECO changes to the layout. As noted above, the process. At 802, the EDA tool checks the data associated with a layout object to determine if the object is a metal fill piece. Any suitable identification method can be used to determine if an object is associated with a piece of metal fill. For example, a metal fill identifier can be associated with the data structure for a metal fill object.

If the determination is made that an object is a metal fill object (804), then the EDA tool is configured to not take that object into account during placement and routing activities (806). In effect, the placement and routing actions are performed without regard for the existence of the metal fill pieces (808). This happens even if the placement and routing activities add or configure other layout objects in a manner that causes shorts or DRC violations relative to the existing metal fill geometries.

Figure 3:
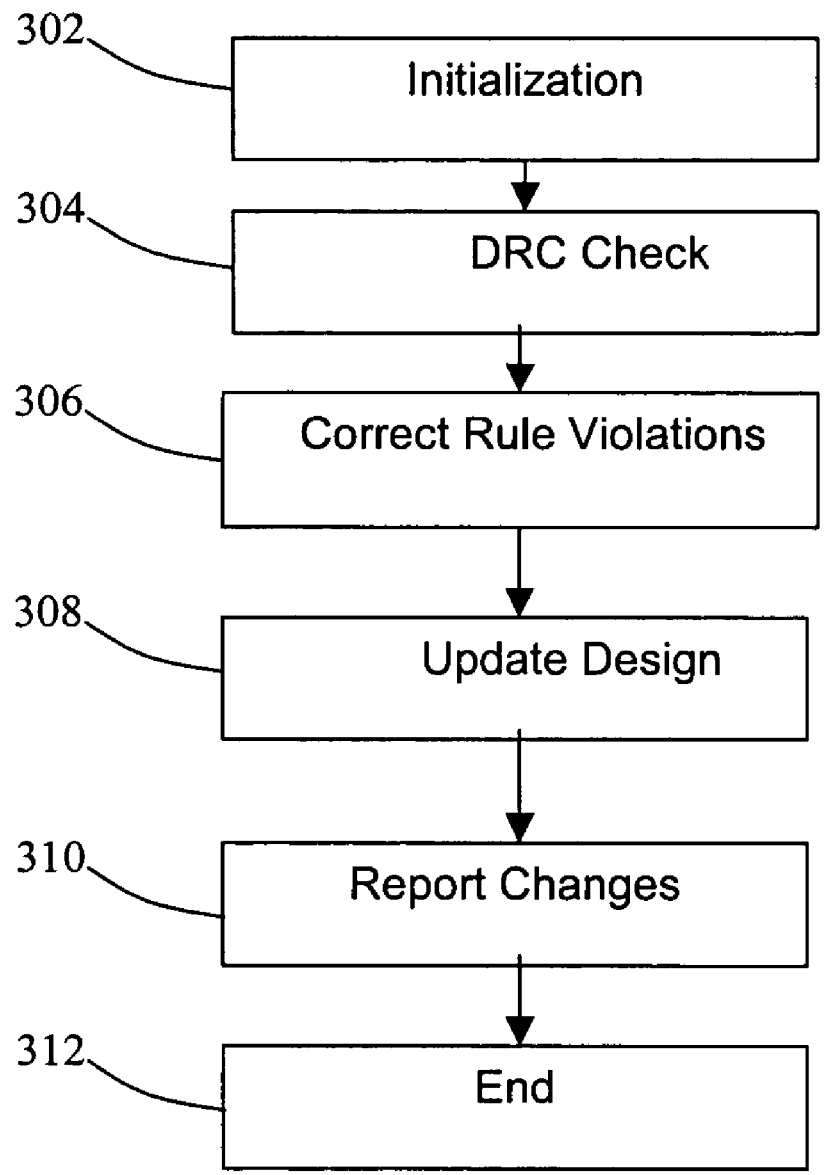
FIG. 3 shows a flow diagram of a process for repairing metal fill after ECO according to some embodiments of the invention.

FIG. 3 depicts a flowchart of a process for performing incremental metal fill repair according to some embodiments of the invention. At 302, any initialization activities that may be required are performed. Such initialization activities include, for example, loading the design or preparing the design into memory.

At 304, a design rule check (DRC) is performed upon the ECO-changed IC design. The DRC check will identify any rules violations caused by the combination of the existing metal fill geometries and the layout changes from the ECO.

At 306, the identified rules violations are corrected. An example method for correcting the rules violation is to trim away excessive metal fill. Other example approaches for implementing this action is to add metal fill or change metal fill properties or dimensions. The design data in a database is updated at 308. A report can be made of the changes at 310.

Figure 4:
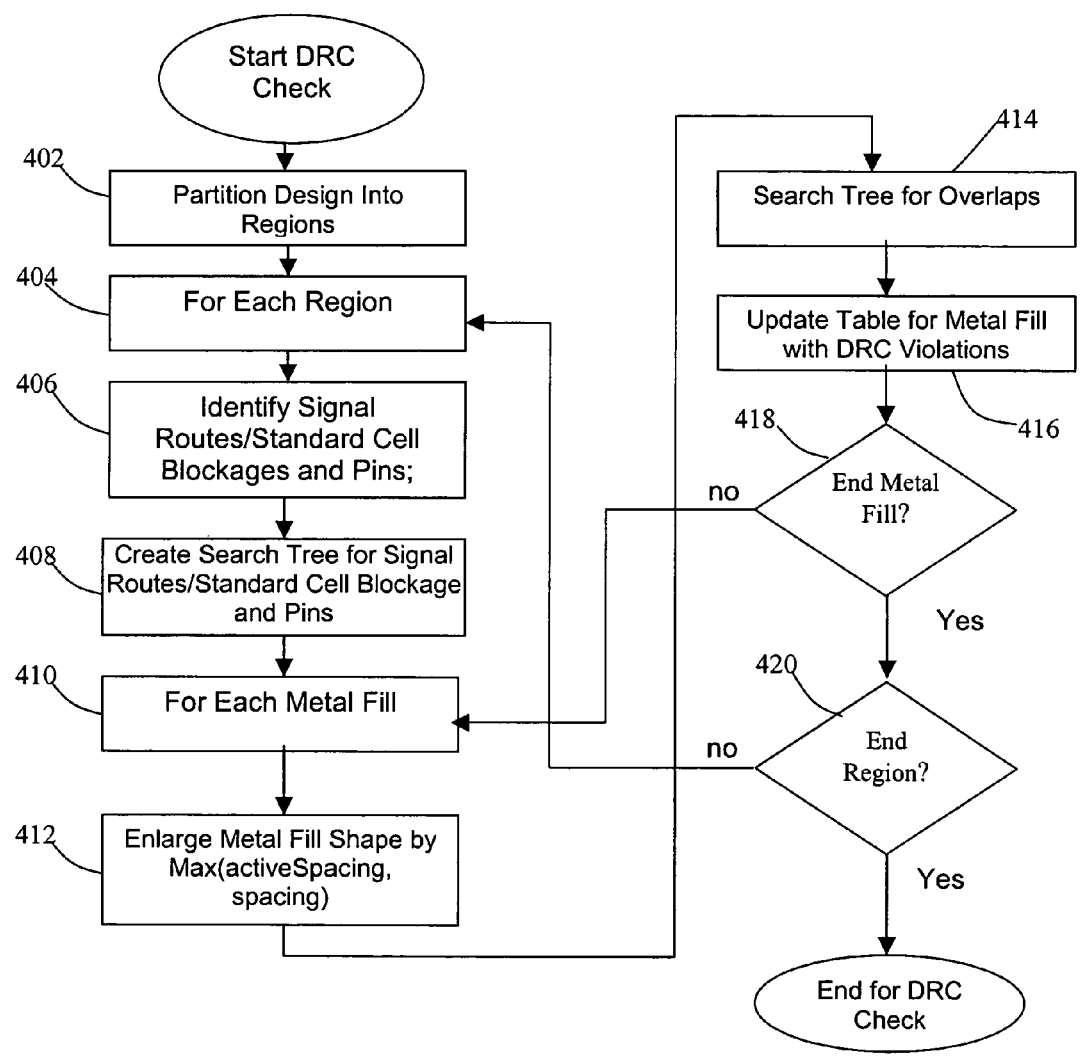
FIG. 4 shows a flow diagram of a process for performing DRC according to some embodiments of the invention.

FIG. 4 depicts a process flow for performing the DRC check 304 of FIG. 3 according to some embodiments of the invention. At 402, the design is partitioned into different regions. At 404, for each of the partitioned regions, actions 406-418 are performed.

At 406, structures that potentially were changed during the ECO are identified. Examples of such structures include signal route objects and standard cells. Structures that likely have not been changed include power busses. One reason for performing this action is to improve performance by only focusing the DRC check upon objects that might have changed during the ECO, and therefore ignoring other objects that probably were not changed. Alternatively, this action can be implemented to search all structures, regardless of the likelihood that they were changed during the ECO, to ensure that all rules violations are identified. At 408, a search tree is created to search the structures identified in action 406.

For each of the metal fill objects, the actions of 412-416 are performed to check for spacing rule violations (410). The spacing rule used for DRC checking in the present embodiment considers both active spacing, which is the spacing between a metal fill geometry and an active line, as well as a possible wide wire spacing rule. Each metal fill piece will be checked against wide wire spacing rule if exists and the bigger spacing among active spacing and width dependent spacing will be used for DRC checking and trimming. One technique for performing a spacing check is to enlarge a metal fill shape by a given spacing threshold (412), and determining if the enlarged metal fill overlaps against another object. The amount to enlarge each fill object is based upon previous spacing threshold that satisfies the design rules. If the ECO changed the layout to make some or all of the spacing between metal fill objects and other objects smaller than the spacing threshold, this will cause the enlarged fill objects to overlap adjacent other objects. If so, then a spacing rule violation has been identified. The search tree is therefore searched for such overlaps (414). This will also serve to identify any fill-related shorts that exist in the design.

A table or list is maintained that identifies any DRC check violations (416). In one embodiment, each metal fill piece that has a DRC violation against signal routes and standard cell pins/cell blockages will be record in a hash table with a list of shapes that has DRC violations against it.

At 418, a determination is made whether there exits any additional metal fill to check. If so, then the process returns back to 410. At 420, a determination is made whether there exists any additional regions to check in the IC design. If so, then the process returns back to 404.

Figure 5:
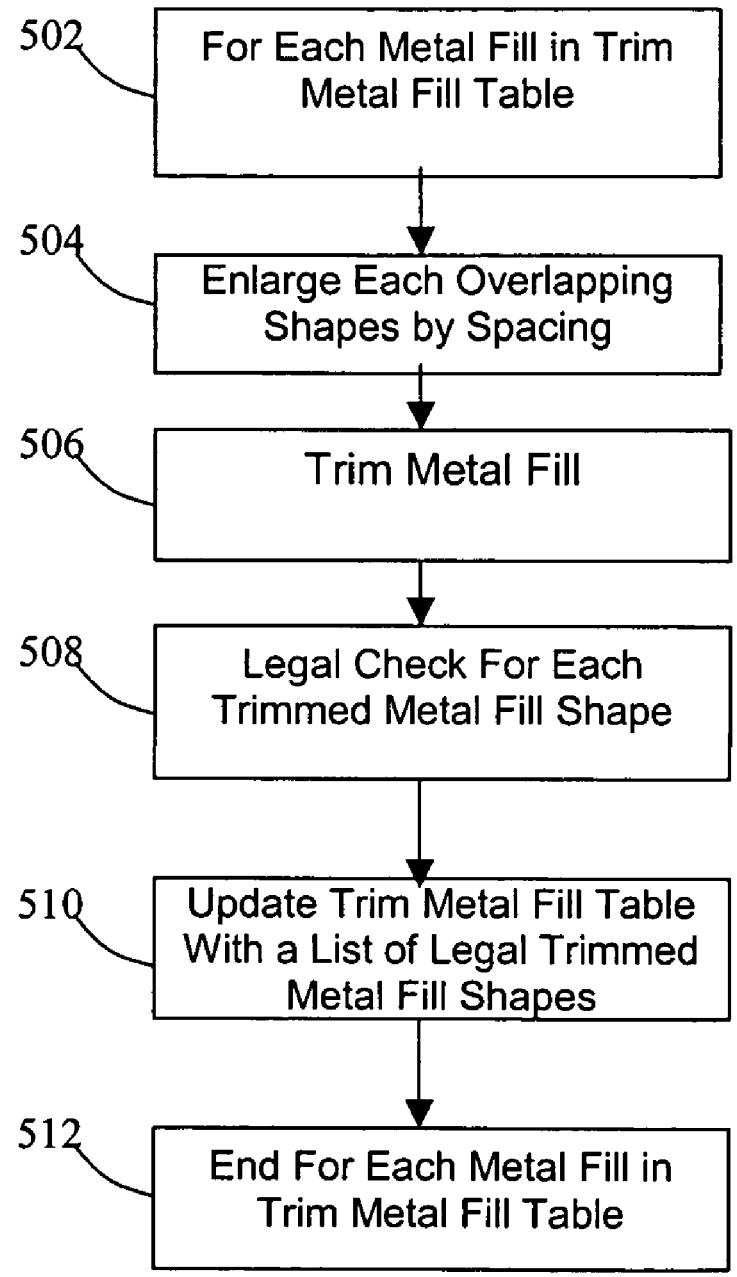
FIG. 5 shows a flow diagram of a process for performing metal fill trimming according to some embodiments of the invention.

FIG. 5 depicts a flow of a process for trimming metal fill according to some embodiments of the invention. The process works through each metal fill object that should be trimmed, e.g., from a hash table of identified metal fill objects resulting from the process of FIG. 4 (502).

At 504, the process enlarges each signal wire, or other object that was identified as being overlapped by a metal fill from the process of FIG. 4. A logical AND can be performed to identify the portion of the metal fill to be trimmed away. At 506, the identified portions of the metal fill object is trimmed away using a logical NOT operation. A scan line algorithm can be used to perform the trimming operation to clean the DRC violation.

A check is made on the trimmed metal fill shape(s) to ensure that the remaining metal fill satisfy design rule legality requirements. For example, the remaining metal fill shape should not be smaller than minimum size requirements. If the remaining metal shape is too small, then it can be addressed, for example, by being removed from the layout. Additional examples of legality checks that may be performed include checking for minimum width, minimum length, manufacturing alignment, active spacing, parallel run spacing rule, minimum area rule, and minimum hole rule.

The list of metal fills is updated to include data regarding the trimmed metal fill objects at 510. The process then ends for the identified metal fill object.

Figure 6:
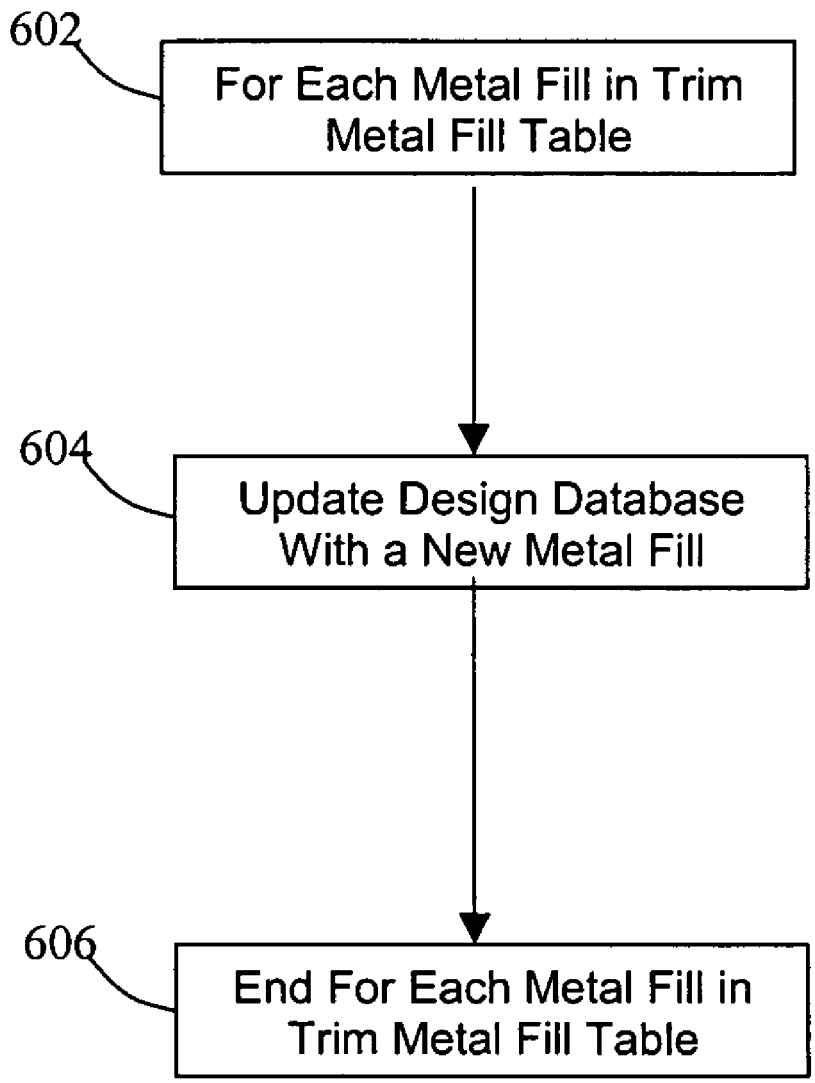
FIG. 6 shows a flow diagram of a process for updating a design database after metal fill repairs to floating metal fill according to some embodiments of the invention.

FIG. 6 shows a flowchart of a process for updating a design database in the floating metal fill case. The process is performed for each metal fill object in the trim metal fill table (602). If the metal fills presented in the design are floated, then after trimming and legality check for the trimmed pierce, the original metal fill piece that has DRC violation are deleted from design database. DRC legal parts after trimming will be added back to design database for minimum metal density impact (604).

The process is more complex if metal fill in the design are tied to ground or power nets. This is because after the ECO and metal fill repairs actions, the layout changes may cause a piece of metal fill that used to be tied to ground or power to become a piece of floating metal fill.

Figure 7:
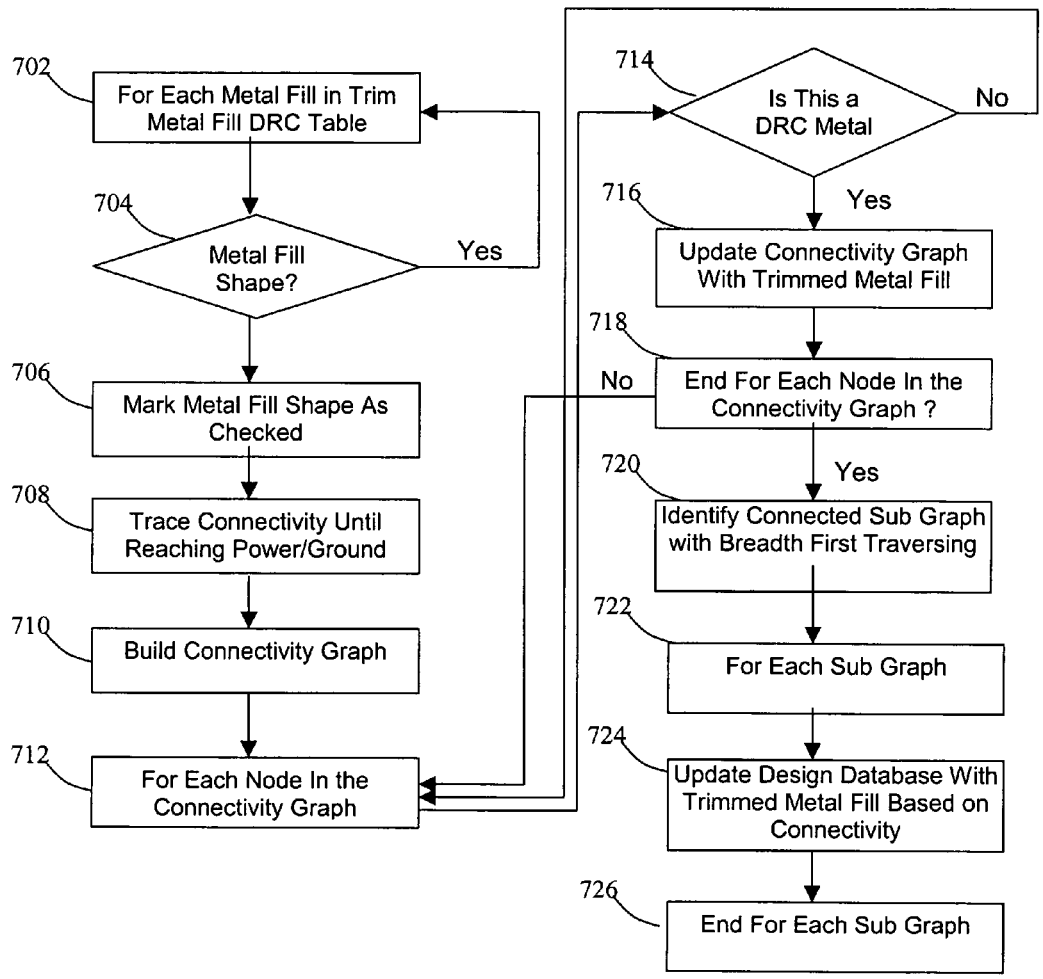
FIG. 7 shows a flow diagram of a process for updating a design database after metal fill repairs to fill ties to power or ground according to some embodiments of the invention.

FIG. 7 is a flow chart of a process to update the design database if the original metal fill in the design is tied to ground or power nets. As the process goes through each metal fill related to a DRC violation (702, 704), the metal fill object is marked as checked (706).

The connectivity of the metal fill is traced after metal fill trimming (708). This action traces connectivity until power or ground has bee reached. A connectivity graph is built based upon this tracing action (710). A loop is performed until each node in the connectivity graph is checked (712). If the node was previously identified as a metal fill relating to a DRC violation, then it is checked further. The connectivity graph is updated to identify the trimmed metal fill (716). Otherwise, the process returns to 712 to select another node in the connectivity graph.

The process recognizes the new connectivity for the trimmed metal fill pieces that are to be updated in the design database. The process identifies and analyzes connected subgraphs, e.g., using a breadth first traversing algorithm (720, 722). The floating segments of metal fill that used to tie to power/ground will be updated as floating metal fill and the vias that used to connect them will be deleted in the design database (724). The parts that are still tied to power/ground will be remained as part of power/ground structure after design database update.

System Architecture Overview

Figure 9:
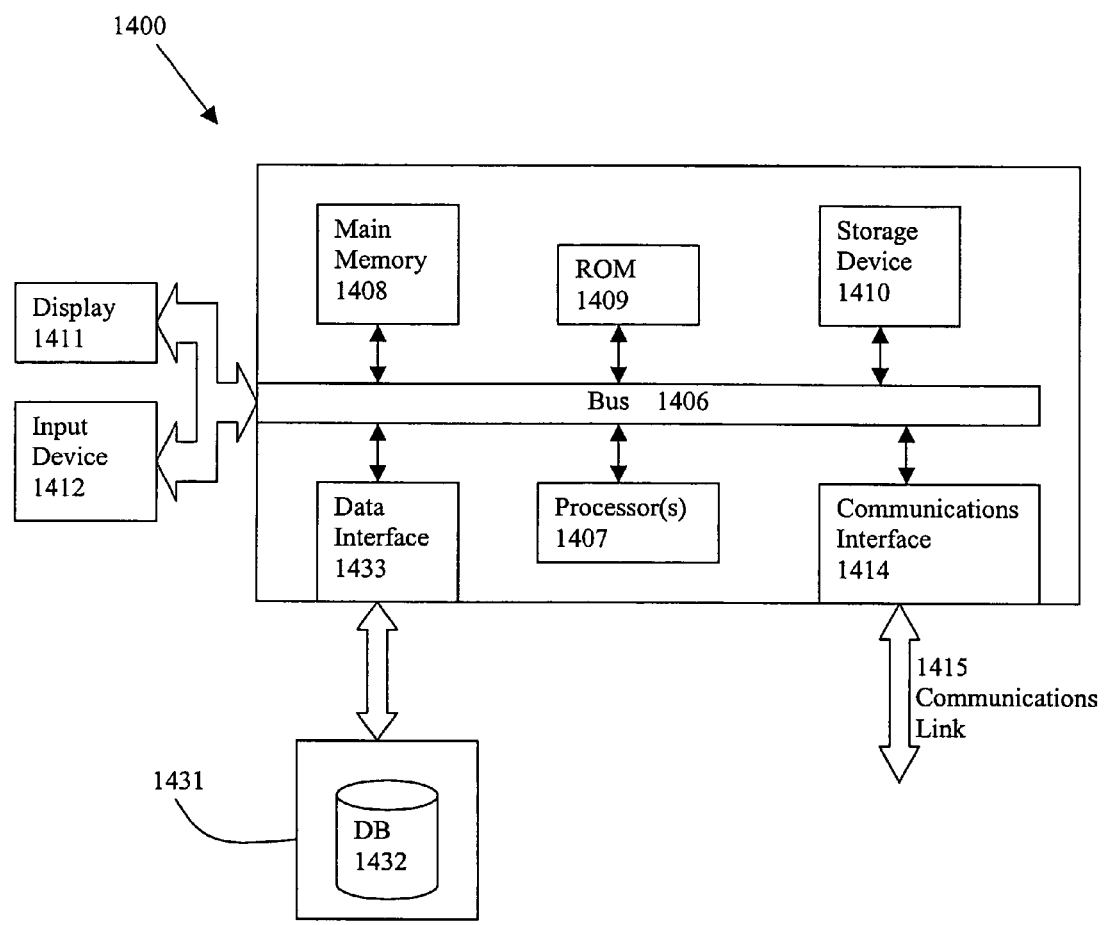
FIG. 9 illustrates an example computing architecture with which the invention may be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410.

Volatile media includes dynamic memory, such as system memory 1408. Transmission media includes coaxial cables, copper wire, and fiber optics, including wires that comprise bus 1406. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method for implementing metal fill on an integrated circuit design, comprising:
    identifying a design change to a layout for an integrated circuit design, the integrated circuit design comprising existing metal fill;
    implementing the design change by performing placement and routing, while ignoring the existing metal fill on the integrated circuit design, with the design change but without immediate regard for design rule violations caused by interaction between the existing metal fill and the design change, wherein the act of implementing the design change by performing placement and routing is performed while the existing metal fill remains in the integrated circuit design;
    performing, by using a processor, repair on the integrated circuit design with the design change to correct the design rule violations; and
    displaying a result of the act of implementing the design change on a display apparatus or storing the result, by using a computer communication mechanism, in a tangible computer readable storage medium or a storage device.

2. The computer implemented method of claim 1 in which the design change is an Engineering Change Order for a manufactured integrated circuit.

3. The computer implemented method of claim 1 in which the design change is made before tape-out of the integrated circuit design.

4. The computer implemented method of claim 1 in which the act of implementing the design change without regard for design rule violations caused by interaction with the existing metal fill comprises:
    determining whether an object is a metal fill object; and
    configuring an EDA tool to ignore the metal fill object when performing the placement and routing actions.

5. The computer implemented method of claim 1 in which the repair is performed adding metal fill to portions of the integrated circuit design with the design change in which original geometries have been removed.

6. The computer implemented method of claim 1 in which the repair is performed by trimming a metal fill object that is violating a design rule.

7. The computer implemented method of claim 6 in which the act of trimming the metal fill object comprises:
    identifying a layout object corresponding to the metal fill object which causes the design rule violation; and
    trimming the metal fill object such that the combination of the layout object and the metal fill object does not violate a design rule.

8. The computer implemented method of claim 7 in which the act of trimming the metal fill object comprises:
    enlarging the boundary of the layout object; and
    performing a logical NOT operation between the enlarged layout object and the metal fill object to trim the metal fill object.

9. The computer implemented method of claim 6 further comprising:
    checking the trimmed metal fill object for compliance with the design rules.

10. The computer implemented method of claim 9 in which the trimmed metal fill object is checked to ensure compliance with at least one of the following rules: minimum width, minimum length, manufacturing alignment, active spacing, parallel run spacing rule, minimum area rule, minimum hole rule.

11. The computer implemented method of claim 1 further comprising:
    updating a design database if tied-off metal fill is converted to floating metal fill.

12. An integrated circuit product formed using the method of claim 1.

13. A system for implementing metal fill on an integrated circuit design, comprising:
    logic for identifying a design change to a layout for an integrated circuit design, the integrated circuit design comprising existing metal fill;
    logic for implementing the design change by performing placement and routing while ignoring the existing metal fill on the integrated circuit design with the design change but without regard for design rule violations caused by interaction between the existing metal fill and the design change, wherein the logic for implementing the design change by performing placement and routing is invoked while the existing metal fill remains in the integrated circuit design;
    a processor configured for performing repair on the integrated circuit design with the design change to correct the design rule violations; and
    a display apparatus configured for displaying a result generated by the logic for implementing the design change or a communication mechanism configured for storing the result in a tangible computer readable storage medium.

14. The system of claim 13 in which the design change is an Engineering Change Order for a manufactured integrated circuit.

15. The system of claim 13 in which the design change is made before tape-out of the integrated circuit design.

16. The system of claim 13 in which the logic for implementing the design change without regard for design rule violations caused by interaction with the existing metal fill comprises:
   logic for determining whether an object is a metal fill object; and
   logic for configuring an EDA tool to ignore the metal fill object when performing the placement and routing actions.

17. The system of claim 13 in which the repair is performed by adding metal fill to portions of the integrated circuit design with the design change in which original geometries have been removed.

18. The system of claim 13 in which the repair is performed by trimming a metal fill object that is violating a design rule.

19. The system of claim 18, in which means for trimming a metal fill object further comprises:
   means for identifying a layout object corresponding to the metal fill object which causes the design rule violation; and
   means for trimming the metal fill object such that the combination of the layout object and the metal fill object does not violate a design rule.

20. The system of claim 19, in which the means for trimming the metal fill object further comprises:
   means for enlarging the boundary of the layout object; and
   means for performing a logical NOT operation between the enlarged layout object and the metal fill object to trim the metal fill object.

21. The system of claim 18, further comprising:
   means for checking the trimmed metal fill object for compliance with the design rules.

22. The system of claim 13, further comprising:
   means for checking the trimmed metal fill object for compliance with the design rules.

23. A computer program product comprising a computer usable medium having executable code which, when executed by a processor, causes the processor to execute a process for implementing metal fill on an integrated circuit design, the process comprising:
   identifying a design change to a layout for an integrated circuit design, the integrated circuit design comprising existing metal fill;
   implementing the design change by performing placement and routing while ignoring the existing metal fill on the integrated circuit design with the design change but without regard for design rule violations caused by interaction between the existing metal fill and the design change, wherein the act of implementing the design change by performing placement and routing is performed while the existing metal fill remains in the integrated circuit design; and
   performing, by using the processor, repair on the integrated circuit design with the design change to correct the design rule violations.

24. The computer program product of claim 23 in which the design change is an Engineering Change Order for a manufactured integrated circuit.

25. The computer program product of claim 23 in which the design change is made before tape-out of the integrated circuit design.

26. The computer program product of claim 23 in which the act of implementing the design change without regard for design rule violations caused by interaction with the existing metal fill comprises:
   determining whether an object is a metal fill object; and
   configuring an EDA tool to ignore the metal fill object when performing the placement and routing actions.

27. The computer program product of claim 23 in which the repair is performed by adding metal fill to portions of the integrated circuit design with the design change in which original geometries have been removed.

28. The computer program product of claim 23 in which the repair is performed by trimming a metal fill object that is violating a design rule.

29. The computer program product of claim 28, in which the process further comprises:
   checking the trimmed metal fill object for compliance with the design rules.

30. The computer program product of claim 29, in which the step of the process where the repair is performed by trimming a metal fill object further comprises:
   enlarging the boundary of the layout object; and
   performing a logical NOT operation between the enlarged layout object and the metal fill object to trim the metal fill object.

31. The computer program product of claim 28, in which the process further comprises:
   checking the trimmed metal fill object for compliance with the design rules.

32. The computer program product of claim 23, in which the process further comprises:
   checking the trimmed metal fill object for compliance with the design rules.

* * * * *